United States Patent [19]
Williams

[11] Patent Number: 5,801,826
[45] Date of Patent: Sep. 1, 1998

[54] SPECTROMETRIC DEVICE AND METHOD FOR RECOGNIZING ATOMIC AND MOLECULAR SIGNATURES

[75] Inventor: Richard Ernest Williams, Lake Mary, Fla.

[73] Assignee: Williams Family Trust B, Corvallis, Oreg.

[21] Appl. No.: 802,169

[22] Filed: Feb. 18, 1997

[51] Int. Cl.$^6$ ............................... G01J 3/06; G01J 3/32
[52] U.S. Cl. .......................... 356/307; 356/308; 356/328
[58] Field of Search ..................................... 356/307, 308, 356/326, 328

[56] References Cited

U.S. PATENT DOCUMENTS 4,766,551  8/1988  Begley ..................................... 356/308 X

*Primary Examiner*—Vincent P. McGraw

[57] ABSTRACT

Complex atomic or molecular spectral signatures embedded in interfering background spectra are very rapidly recognized by a spectrometric device that employs precise sweep rate control with signal slope extraction. Very fast optics become feasible. High signal to noise ratios are attained in each of three operational modes. The first, PURGE, is frequently invoked and stores an ambient background pattern in differentiated form. The second, TARGET, stores a signature derived from a target substance placed within the invention's sensing range. The signature retains only signal derivatives that significantly depart from those encountered during PURGE. A SEEK mode employs a similar derivative extraction algorithm, and searches for matches to TARGET signatures stored in a memory bank. During SEEK, pattern correlations to stored targets are sensed, and results displayed.

12 Claims, 4 Drawing Sheets

5,801,826

SPECTROMETRIC DEVICE AND METHOD FOR RECOGNIZING ATOMIC AND MOLECULAR SIGNATURES

TECHNICAL FIELD

The present invention relates to pattern recognition and spectrometry, and especially to rapid recognition of complex spectra in interfering backgrounds.

BACKGROUND ART

Electromagnetic spectrometry is widely used in chemical, physical, medical, forensic, and other disciplines to identify substances. Optical spectrometers employ prisms, filter wheels, diffraction gratings, lasers, or interferometers in regions extending from x-rays through far infrared. The present invention relates to such devices. Multiple-volume listings of optical spectra are available from numerous library sources. Many references are listed in the *Handbook of Chemistry and Physics*, published by CRC Press.

Recognition and identification of more than 10,000 substances by their atomic or molecular spectra are currently facilitated by personal computer (PC) search programs in which locations of spectral peaks are quickly matched to known substances. Although a computerized library search typically takes only seconds, it has to be preceded by an accurate collection of spectral data obtained by a delicate and costly spectrometer. A preliminary, usually manual, selection and designation of significant peaks must be undertaken. In broad band systems when those peaks are embedded in a background of hundreds of irrelevant peaks, a difficult and time consuming job precedes a computer search. A user must be well trained to attain good results.

When signal energies are weak, the spectral sweep must be slow enough to provide adequate dwells upon encountered signals. For that reason, many spectrometers today have to employ cooled detectors or Fast Fourier Transform (FFT) implementations to obtain even moderate speeds. Their resulting cost is high. All spectrometers require compromises among objectives of spectral coverage, sensitivity, resolution, speed, and cost. Same designs allow a user to choose among operating modes to favor selected objectives. In every case, performance is adversely affected when interfering backgrounds due to contaminants, complex bonding to extraneous substances, etc., are encountered. Typical f-numbers (ratio of focal length to aperture diameter) range from 4 to over 10. An octave spectral scan frequently consumes minutes.

Conventional computer searches employ sorting algorithms of the type used for dictionary look up or number ordering. They do not comprise true pattern recognition, and work only with fundamentally invariant line locations. The main recognition task falls upon the shoulders of the user. For example, spectral band combinations may be irrelevant in certain cases but significant in others. The user must judge appropriately.

SUMMARY OF THE INVENTION

Even in very low signal-to-noise applications, target energies in a scanned spectrum will frequently exhibit detectable perturbations or slopes. The present invention emulates the recognition process of human neural nets which predominantly employ on-off (differentiating) neurons. Energy slopes are exploited by sweeping extremely rapidly, and imposing precise control of the sweep's rate and position so that differentiation with respect to time can be repeated with consistency. Interferences from strong broadband signals are greatly reduced since the energy ratios between their time derivatives and those of weak signals are typically much lower than those of zero order energies. No steady state amplitude response is needed in the invention. A stable clock assures precise sweep repeatability among operating modes. Three major operational modes are: "PURGE", "TARGET", and "SEEK".

In PURGE the invention sweeps the background spectrum and stores a pattern in the form of an ordered sequence of digital words. Each word describes the magnitude of the rate of change of energy (derivative) observed at an indexed spectral point. In most applications, PURGE is repeatedly invoked to ensure that background changes are constantly updated.

In the second mode, TARGET, a selected target substance is placed within the invention's sensing range as the spectrum is swept. The invention identifies and stores the target's signature by subtracting its intercepted data from PURGE data. Spectral locations of higher magnitude derivatives are placed into memory. Later searches for the target then can be spectrally directed to those locations to attain a high intercept probability and improved noise rejection. A TARGET mode can be invoked on site when desired, but many target signatures can be provided in a LIBRARY. A LIBRARY is typically generated by the invention manufacturer.

Last, a SEEK mode searches for signature correlations to TARGET or LIBRARY files after performing a similar sweep process. Correlations to stored targets are measured, and results displayed. SEEK is the most frequently used mode, and comprises a recognition process.

A precisely controlled rapid sweep rate coupled with signal differentiation leads to a number of attractive features. It allows the use of inexpensive and highly sensitive low f-number optics. An f-number less than f/1 is quite feasible, and produces an optical gain frequently more than 100 times better than conventional spectrometers. Since first derivatives go to zero at inflection points, they cause input signal peaks to be manifested as post-detection zero crossings. Dynamic range improvements are attained, and recognition cues in the form of polarities are generated. Since detector output noise often exhibits a 1/f characteristic; i.e., it drops off inversely with frequency, differentiation tends to reduce deleterious noise components. Last, a sweeping spectrometer almost always has a varying baseline due to spectral variations in optical components, radiation sources, etc. With differentiation, broad variations are implicitly greatly reduced, and a loss of zero-order energy data is irrelevant to the invention.

It is therefore an object of the present invention to provide a spectrometric method and apparatus for very rapidly detecting and recognizing complex spectral patterns in the presence of interfering spectral energies.

Another object of the invention is to provide a method and apparatus that enables a relatively untrained user to spectrally detect and recognize target substances.

A further object is to provide a differentiating method and apparatus that generates robust recognition cues in a spectrometer.

Still another object is to provide a very large recognizing capacity within austere storage requirements in a spectrometer.

Yet another object of the invention is to provide a sensitivity increase in an optical spectrometer by employing extremely low f-numbers and differentiating a spectrum sweep to regain resolution.

Still another object is to reduce the cost and complexity of a high performance spectrometer.

Yet another object is to provide a light weight, lower power consumption, portable spectrometer capable of performing target substance recognition.

BRIEF DESCRIPTION OF THE DRAWINGS

The present invention will now be described in detail in the following portions of this specification when taken in conjunction with the attached drawings in which like reference characters identify identical apparatus, and in which.

DETAILED DESCRIPTION OF THE PREFERRED EMBODIMENTS

Figure 1:
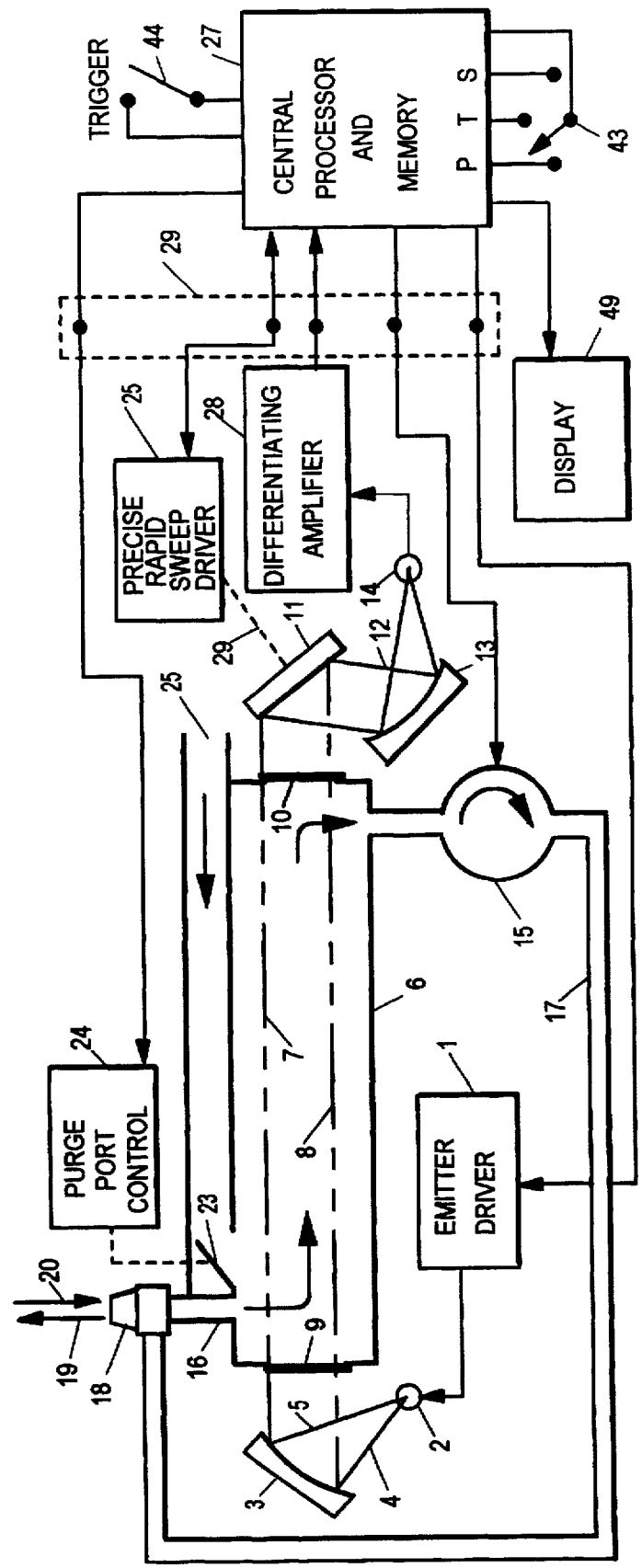
FIG. 1 is a basic block diagram of a gas-sensing embodiment of the invention.

Referring to the block diagram of FIG. 1, an EMITTER DRIVER 1 excites a relatively low power emitter 2. If energy conservation such as for battery operation is desired, DRIVER 1 can be deenergized during inactive intervals by CENTRAL PROCESSOR 27. Emitter 2 may comprise a conventional lamp, a rod of silicon carbide, a small loop of nickel-chromium or similar wire, or other radiant source for the spectral region to be scanned. In each case high efficiency is attained by physically forming the emitter to approximate the geometry of the responsive surface of photodetector 14. When energized, emitter 2 irradiates a low f-number collimation element 3 as indicated by rays 4 and 5. The radiation typically encompasses a broad optical or infrared spectrum.

Whereas it is not unusual for conventional spectrometer emitters to dissipate more than 100 watts, very high optical efficiency in the present invention allows the use of an emitter dissipating less than one watt. An f-number of unity has been satisfactorily employed. A high optical speed introduces aberrations, however. It leads to imperfect optical collimation and limited resolution. In the present invention, the ability to recognize overshadows quantitative measurements, just as exact metrical processes are irrelevant to a human's recognition process. A differentiation process in the invention later recovers much of the lost resolution.

Figure 7:
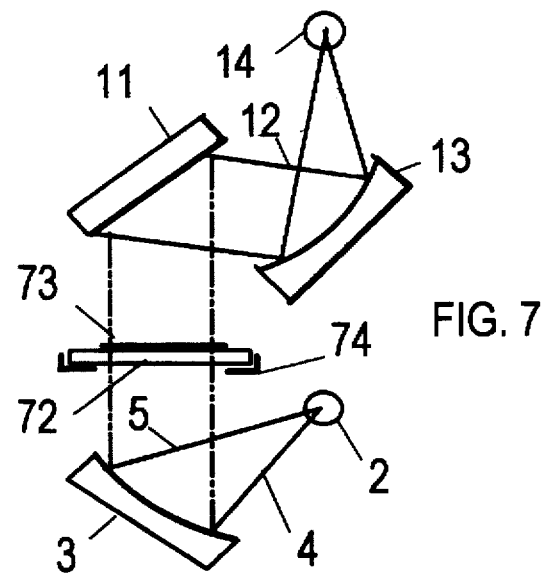
FIG. 7 is a sample chamber to accept slide-mounted substances.
Figure 6:
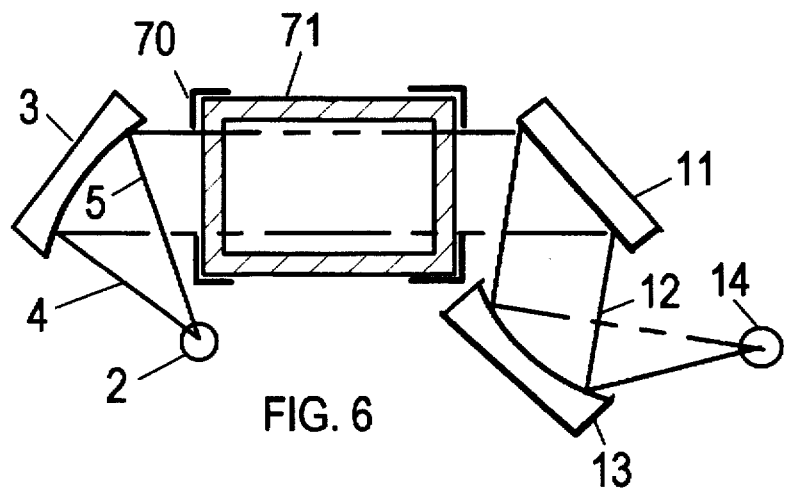
FIG. 6 is a sample chamber to accept liquid substances.

FIG. 1 shows a gas phase embodiment of the invention. The invention's unique properties can also be applied to recognition of liquid or solid substances merely by substituting appropriate sample chambers for plenum 6. Such substitutions are shown in FIGS. 6 and 7. Thus, although a gas recognition method will be described in detail, generally simpler sample chambers can accommodate other substances.

Element 3 of FIG. 1 projects collimated radiation 7,8 through plenum 6 and transparent windows 9 and 10 onto scanning dispersive element 11. Element 11 may be a diffraction grating, prism, interferometers structure, or other conventional wavelength separating device. Thus a scan of radiated wavelengths is provided in output beam 12 by physical motion of 11. Beam 12 is intercepted by focusing element 13 which, like element 3, has a very low f-number. Element 13 directs the beam onto a photodetector 14. For broadband coverage, it is usually desirable to employ mirror reflectors as elements 3 and 13.

Figure 2:
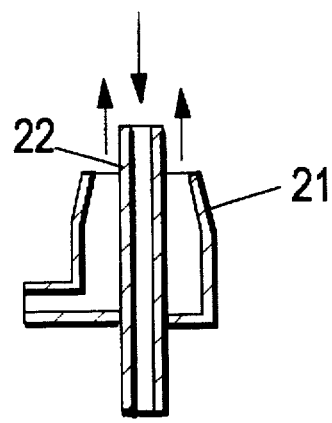
FIG. 2 is a cross section of a free molecule collecting nozzle.

Plenum 6 is part of a gas recirculating loop comprising pump 15, connecting tubes 16 and 17, and nozzle 18. The loop causes free molecules residing in external air or gas near nozzle 18 to be drawn into plenum 6. The direction of gas or air flow near the nozzle is indicated by arrows 19 and 20. FIG. 2 is a cross sectional view of nozzle 18. Outgoing air is forced through an annular orifice 21 surrounding inner nozzle 22. As is well known in pneumatic design, a gas or liquid under positive pressure can be shaped and directed into a stream. Negative pressure in space, on the other hand, tends to distribute throughout a spherical volume relatively independent of nozzle shape. If a small target is to be recognized at highest sensitivity, it is important to minimize dilution by surrounding air. The nozzle of FIG. 2 provides three major advantages; the positive jet stream generated by annular orifice 21 stirs up molecules at the target surface, the positive stream surrounds and confines the negative pressure region of inner nozzle 22, and the regenerative action of the loop causes the positive stream to have a higher concentration of target molecules than surrounding air. Accordingly, the nozzle can be pointed at a target substance to efficiently collect its free molecules while reducing dilution from surrounding air. The tubular path length 16 of FIG. 1 from nozzle 18 to plenum 6 is preferably held to a minimum to optimally transport free molecules to the plenum.

In the embodiment of FIG. 1, a purge invokes one or both of two essentially independent processes. A physical purge comprises a cleansing of plenum 6 to remove contaminants. An electrical purge updates an electrical background baseline that represents a sweep of background alone. In a simplest procedure, pump 15 is operated continuously so as to physically purge plenum 6 at a moderate rate, and electrical purges are periodically invoked by the operator or PROCESSOR 27. When more rapid and complete physical purges are needed, an augmented embodiment includes port 23. The port can be opened between measurements by PROCESSOR 27 and PURGE PORT CONTROL 24, or by direct operator control. When port 23 is opened, it allows a large air flow through orifice 25 to enter the plenum. Orifice 25 is preferably sufficiently remote from the nozzle to avoid contaminated purges.

For maximum free-molecule recognition efficiency, plenum 6 should have a maximum internal length-to-volume ratio. Unlike conventional spectrometers where long optical throws are used to improve resolution, the present invention minimizes radiation beam lengths outside of the plenum. Atmospheric constituents such as water vapor in any beam segment will cause beam absorptions. Such absorptions reduce target detection probabilities, and increase background interferences. The very short focal lengths and low f-numbers of the present invention greatly minimize such problems, however.

Another departure from conventional practice relates to beam balancing. The present invention's extremely high sweep rate and high sensitivity do not favor traditional methods of beam balancing to subtract out residual absorptions. Chopping (time multiplexing) against a reference beam requires a chopping rate of 10,000 chops per second or more to avoid deleterious timing errors that will be described below. If beam splitting is used (with a half-silvered mirror for example), transmission loss is high, broad spectral coverage is difficult, cost is increased, and broad band balance is troublesome. Instead, the invention's rapid speed favors a procedure that digitally stores and updates complete background sweeps to provide balancing data.

Detector 14 need not respond to steady state, or d-c, levels of radiation. Accordingly, an extremely broad band detector such as a pyroelectric device can be used. The latter senses radiation by developing a surface polarization related to the rate of change, or time derivative, of intercepted energy. Following an energy perturbation, the polarization spontaneously relaxes in an interval determined by the electrical load impedance placed across the detector. Such a detector needs no cooling, can sense radiations extending over many octaves, and has a response that is in many ways similar to human neurons. It is the preferred detector in the present invention. If spectral bandwidth can be sacrificed, a detector such as lead selenide or silicon can be substituted.

Dispersive element 11 is moved at a precisely controlled rate by PRECISE RAPID SEEP DRIVER 26. Wavelength selection thereby becomes a known function of time. If plenum 6 contains molecules having bonds that absorb at specific wavelengths, the output from detector 14 will be perturbed as those wavelengths are scanned. Electron orbital transitions will also produce perturbations mainly at visible and ultraviolet wavelengths. Conventional absorption spectrometers work on such principles.

Unlike conventional spectrometers, however, sweep rates in the present invention are critical and very high; in the order of one octave per second. Typical input sweep signals are shown in the top waveforms of FIG. 3 which plot absorption (vertically) against wavelength. An assumed broad atmospheric absorption band 30 is shown in comparison to a typical target-substance single absorption band 31. In practice, the magnitude of background 30 may be hundreds of times greater than target 31, and the target may contain many bands similar to 31. Since the wavelength abscissa becomes a post-detection time base due to the sweeping action of dispersive element 11, a Fourier integral analysis over the sweep shows that absorption 30 will produce much stronger low frequency components at the output of detector 14 than target 31. Target extraction is thereby greatly improved by filtering out all low frequency content; i.e., differentiating the detector output.

Figure 3:
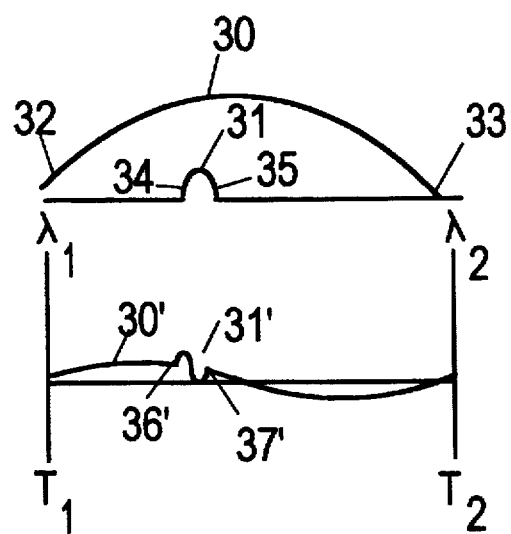
FIG. 3 illustrates the waveform of a typical absorption band superimposed upon a background, and a representation of corresponding differentiated signals.

Large absorption bands such as 30 tend to have low normalized slopes 32 and 33. Narrow bands 31 have fewer diverse bonds and higher normalized slopes 34 and 35. The lower waveforms of FIG. 3 depict post-differentiation representations of the input signals. The ordinate of the lower waveforms is voltage magnitude, and the abscissa, time. Differentiation is shown to greatly improve the magnitude of target 31' relative to interference 30' due to both low frequency rejection and slope advantages. A further valuable recognition cue is created by the target's bipolar components 36' and 37'. Their temporal closeness is used in the invention to reject interference.

Returning to FIG. 1, DIFFERENTIATING AMPLIFIER 28 may be analog or digital in design, and provides a conversion from unprimed to primed waveforms as demonstrated in FIG. 3. Design procedures are well known to those skilled in the art, and are available in numerous publications.

Target signals of interest have little energy at frequencies above 1/T, where T is the duration of signal 31' in FIG. 3. To minimize noise energy, AMPLIFIER 28 should generally not pass frequency components above that value. AMPLIFIER 28 thus becomes bandpass, having a low frequency cutoff providing proper differentiation, and a high cutoff as described.

The differentiated output of AMPLIFIER 28 is connected through interface 29 to PROCESSOR 27 where it is strobed at indexed intervals during a sweep. To avoid alias frequency problems, sampling theory requires that the intervals between strobes be equal to or less than T/2, where T is a swept duration of a target signal as described above. Strobing points must moreover be precisely synchronized to each sweep to maintain repeatable differentiation. Signal parameters at strobed points are converted to digital words by PROCESSOR 27. In a completely self-contained embodiment of the invention, the PROCESSOR can be compactly implemented by any of many microcontrollers available commercially. Alternately, PROCESSOR 27 can reside in a host computer such as a PC or LapTop. Either way, its programmed logic is integral to the present invention, and will be described in detail.

Figure 4:
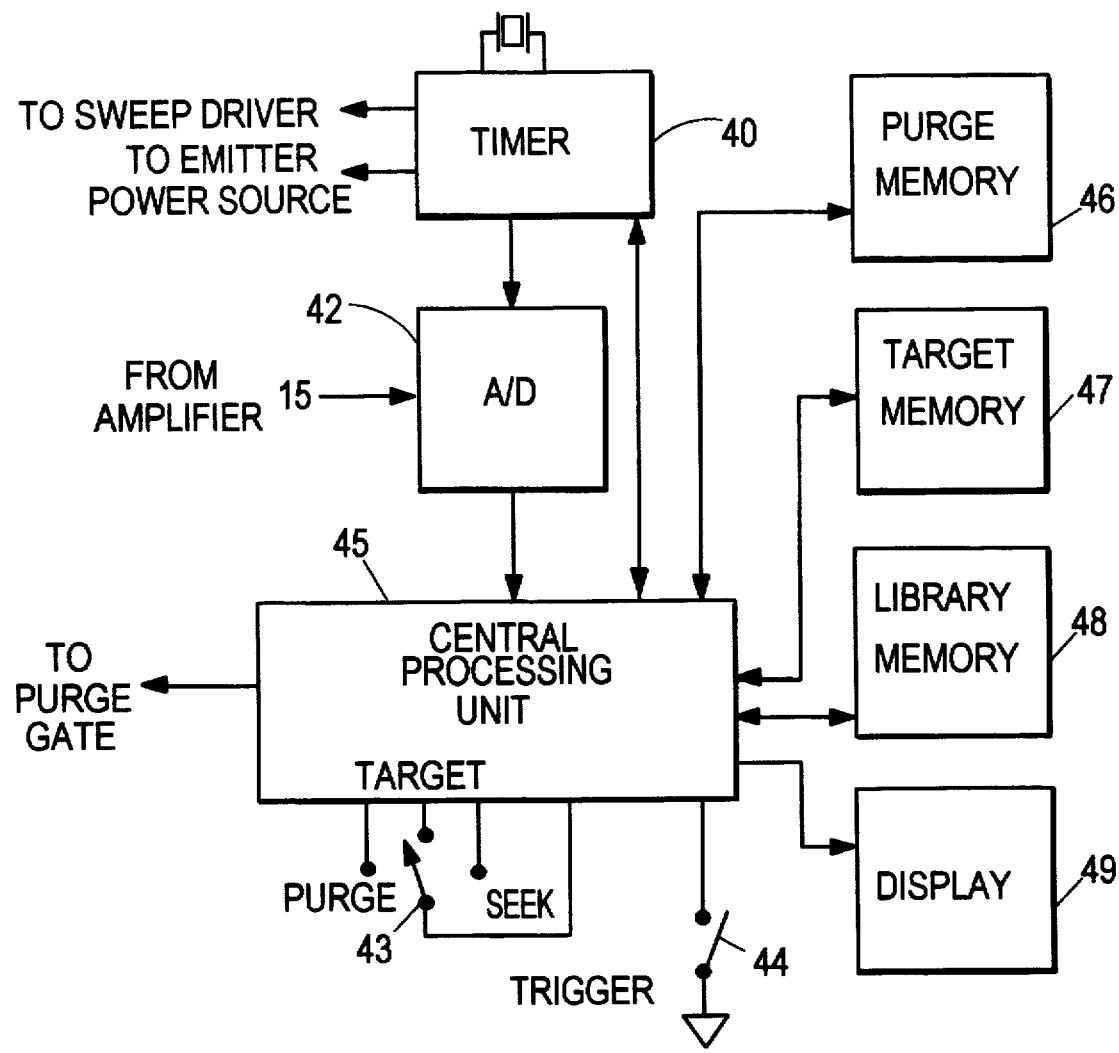
FIG. 4 is a block diagram of signal processing, controlling, and timing logic of the invention.

Referring now to the block diagram of FIG. 4 which details the operations of PROCESSOR 27, TIMER 40 synchronizes all functions of the invention. Timing is critical throughout. For example, if the slope at a signal edge produces a slew rate of 100 volts per second, an error in timing of one millisecond out of a sweep of one second will yield an amplitude error of 0.1 volt. If a maximum signal in the system is limited to, say, five volts, the error equals a target signal amplitude only 34 decibels below the peak signal. For that reason a quartz or ceramic oscillator is employed in TIMER 40. The timer's prime function is to control precisely the rate and position of the spectral sweep, and to strobe and sample the output of AMPLIFIER 28 at accurately indexed and repeatable spectral points during each sweep.

PRECISE RAPID SWEEP DRIVER 26 of FIG. 1 must be an accurate mechanical actuator. Stepper motors or servo motors with optical or solid state digitizers can provide repeatable position accuracies of one part in several thousand. Mechanical coupling between SWEEP DRIVER 26 and element 11, indicated by dashed line 29, can be direct or can take any of many conventional forms including a cam follower, timing belt, low backlash gear train, etc. DRIVER 26 must additionally be able to sense "home", an absolute position reference for the sweep. Such requirements are met, for example, in many disk drives for computers.

Returning to FIG. 4, A/D converter 42 provides a digital word representing a signal amplitude whenever strobed by TIMER 40. The A/D is provided with a bilateral threshold so that it will always ignore very small variations at its input. Noise is thus rejected.

A PURGE mode, operator selected by switch 43 or automatically by CPU 45, will first be described. If operator selected, nozzle 18 of FIG. 1 is positioned by the operator to sense only background; e.g., surrounding air. If CPU selected, PURGE PORT CONTROL 24 provides the same function. After assuring that only non-target free molecules populate plenum 6 (by imposing a delay, for example), the operator initiates action by actuating trigger switch 44, or the CPU does the same automatically. The trigger starts a sweep and strobing sequence. At each strobe a digital word from A/D converter 42 is placed into PURGE MEMORY 46 by CPU 45. Assume, for example, that a sweep contains 64 strobes. Sixty-four words expressing amplitudes are therefore placed in order into memory which may be RAM, EEPROM, etc. The word sequence describes an accurate background baseline that may undulate throughout a sweep. A typical baseline is represented by differentiated background waveform 30' of FIG. 3. Target waveform 31' is not included because PURGE senses only backgrounds. The PURGE baseline is essentially stationary from sweep to sweep, and provides a reference for later measurements. Its update (by instigating another PURGE mode) comprises an electrical purge as described above.

A PURGE sweep should immediately precede a TARGET sweep to assure that background sweep components are similar. A TARGET mode is selected when the operator sets switch 43 to a "TARGET" position, and TRIGGER 44 is actuated. In TARGET, the same sweep sequence as PURGE takes place, except that nozzle 18 is placed very near a target substance. A target signature will thus emerge from the background level. Digital words from A/D 42 will depart from previously stored PURGE background data wherever target perturbations are encountered during a sweep. CPU 45 performs a subtraction operation between each stored PURGE entry (background alone) and corresponding TARGET entry (including background). The difference sequence contains amplitude, polarity, and spectral location data almost exclusively of the target substance, and is stored in TARGET MEMORY 47. It thus comprises a target signature. Of the data, amplitude is the least reliable since it is most affected by irrelevant variations between sweeps.

Figure 5:
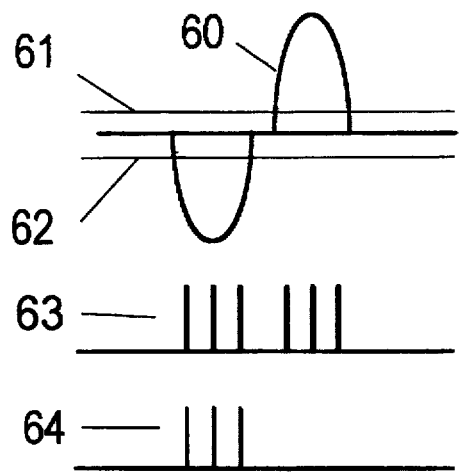
FIG. 5 illustrates digitization of a differentiated signal.

Referring to FIG. 5, the conversion of a signal perturbation to digital form is shown. As the sweep progresses, strobes are counted. Signal perturbations 60 exceeding thresholds 61 and 62 are detected, and CPU 45 in the TARGET mode stores in TARGET MEMORY 47 entire digital words 63 identifying their strobe counts, thus indexing their spectral locations. Single bits 64 associated with every word designate their polarities. In a preferred embodiment of the invention, CPU 45 selects and stores in TARGET MEMORY 47 only N A/D words, where N is an integer less than the number of strobes in a sweep. A particularly simple and useful algorithm selects only the N strobed returns of greatest magnitude. They are most likely to remain detectable as a target substance is weakened, and serve as a valuable cue for separating overlapping signals. Later searches can also ignore interference or noise components outside of the N selected spectral points. A large improvement in signal-to-noise ratio results. Words can further be selected on the basis of uniqueness. For example, if a target comprises two major spectral bands, the CPU can be programmed to assure that both bands are represented, and that the N words are not clustered upon one band despite its breadth and strength.

The number of possible combinations of S strobe locations taken N at a time is $$\frac{S!}{N!(S-N)!} \quad (1)$$

where ! is the factorial. A theoretical coding capacity is accordingly extremely high. For example, if 50 strobes occur per sweep and N=8, the coding capacity is about 500 million. In practice the number of usable signatures is far less, but high nevertheless. Spectral location combinations and corresponding polarities provide strong recognition cues, and the described method intrinsically discards enigmatic fine structure. A stored TARGET signature then comprises a unique reference pattern to which any unknown substance can be compared.

A TARGET signature can be used in two ways: its data can later be used to find a similar signature, or the data can be used to inhibit that signature. For example, if a specific toxic gas is to be sought, its target signature can be used by CPU 45 as a mask to restrict searches to the gas's known spectral regions. Alternately, if a weak unknown signature is to be sought in an atmosphere pungent with cigarette smoke, the latter's signature can be inhibited in a search process.

CPU 45 is able to access LIBRARY MEMORY 48 of FIG. 4. The LIBRARY contains previously stored TARGET reference patterns. A library is normally installed by the manufacturer of the invention, since conditions for generating accurate reference patterns are usually more favorable in a laboratory environment. Stored TARGET signatures are essentially free of background data, and background differences between the manufacturer's location and another site are irrelevant. A conventional dictionary sort enables retrieval of specific patterns in LIBRARY MEMORY. Various patterns can be processed as targets or inhibitors.

A SEEK mode provides a recognition process. When switch 43 of FIGS. 1 and 4 is turned to the SEEK mode and the invention triggered, a sweep and data collection routine similar to that of TARGET takes place. Following the sweep, however, CPU 45 enters a cross correlation routine. Spectral positions and polarities of intercepted perturbations are compared to one or more TARGET and/or LIBRARY references. If a specific target is sought, all spectral points outside of the target's N points can be ignored. A recognition identification and degree of confidence is expressed by the nature and number of spectral line and polarity correlations observed relative to each reference. A maximum positive correlation comprises best recognition. The results are displayed visually or audibly by DISPLAY 49.

In a simplest embodiment, DISPLAY 49 is merely a buzzer, tone, or light that CPU 45 activates whenever a SEEK mode has recognized a selected TARGET above a preset correlation level. In more elaborate embodiments, the display can provide the name of a recognized substance, a degree of confidence (number of correlations), other candidates in order of confidence, the names and nature of molecular bonds or atomic transitions encountered, and other data intrinsically provided by the described processes.

Referring now to FIG. 6, a sampling chamber suitable for liquid-phase recognition is shown. The view is assumed to be looking down on transparent container 71. A liquid substance to be recognized is placed in the container. Container support 70 replaces plenum 6, pump 15, nozzle 18, and PURGE PORT CONTROL 24. Optical elements 3 and 11 are brought closer together as shown in FIG. 6 to minimize total beam length. Other non-optical elements of FIG. 1 remain unchanged. High speed overall operation is identical to that described with reference to FIG. 1, except for the PURGE mode. The latter instead merely requires an operator to place a clean, evacuated transparent container 71 into container support 70, and then invoke an electrical purge to update the background baseline. In some applications, liquid substances have sufficiently large signatures to obviate the need for background updates altogether. Then it is only necessary to establish an initial electrical background baseline by the described PURGE mode, and thereafter assure that liquid containers are clean. Recognition procedures based on targets are identical to those described earlier.

FIG. 7 shows a slide-stage sample chamber for the invention. As in the liquid chamber embodiment, the plenum structure of FIG. 1 is removed and optical elements are placed closer together to minimize beam length. Slide 72 rests on support 74, is transparent to the radiation from emitter 2, and typically carries a microtomed or desiccated sample 73 of a solid substance such as a blood sample, cell culture, etc. All recognition processes remain as described earlier. As in the liquid container case, PURGE modes provide electrical background updates to accommodate variations in atmospheric absorptions.

As is typical of computer control, many modified and alternative algorithms can be used with the basic invention. Thus, while the invention has been particularly shown and described with reference to preferred embodiments thereof, it will be understood to those skilled in the arts that various changes in form and details may be made therein without departing from the spirit and scope of the invention.

What is claimed as new and desired to be protected by Letters Patent is set forth in the appended claims:

I claim:

1. A method of generating a recognition pattern of a target substance in a rapidly sweeping spectrometer comprising the steps of;
    (a) differentiating each spectral sweep signal,
    (b) generating a first differentiated signal from a sweep of background devoid of said target substance,
    (c) generating a second differentiated signal from a sweep of said background plus said target substance, and
    (d) subtracting said first differentiated signal from said second differentiated signal to create said recognition pattern for said target substance.

2. The method of claim 1 which comprises the further steps of:
    (e) storing said recognition pattern,
    (f) cross-correlating a differentiated signal from a subsequent spectral sweep to said recognition pattern to obtain a correlation measure, and
    (g) displaying said correlation measure as a measure of detection and recognition of said target substance.

3. A rapidly sweeping spectrometer device for producing a recognition pattern comprising:
    a source of radiant emission;
    optical dispersion means to separate said radiant emission into spectral components;
    a sample chamber interposed between said source and said dispersion means;
    radiation detection means to convert said spectral components into an electrical signal;
    precision repeatable sweeping means to generate first and second sweeps of said dispersion means and thereby generate corresponding first and second electrical signals;
    differentiating means to extract respective time derivatives of said first and second electrical signals; and
    subtractive means to generate a difference sequence from said respective derivatives;
    whereby said difference sequence comprises a recognition pattern for a detectable content change in said sample chamber between said first and second sweeps.

4. The device of claim 3 further comprising:
    a background substance alone in said sample chamber during said first sweep;
    a background substance plus a target substance in said chamber during said second sweep;
    whereby said difference sequence is a recognition pattern for said target substance.

5. The device of claim 4 further comprising:
    storage means containing a retrievable reference pattern for a known target substance;
    cross-correlation means to determine a correlation measure between said reference pattern and said difference sequence; and
    display means to display said measure as a measure of recognition of said known substance.

6. The device of claim 4 further comprising:
    storage means containing a retrievable reference pattern for a known target substance;
    cross-correlation means to determine a correlation measure between said reference pattern and said difference sequence; and
    masking means to inhibit said difference sequence as a function of said correlation measure.

7. The device of claim 4 in which said sample chamber is a gas plenum, and further comprising:
    pump means to draw first and second external gas samples through said plenum;
    nozzle means to direct free molecules of said target substance into said first gas sample; and
    controllable purging port means sufficiently remote from said nozzle means to direct a background sample substantially devoid of said free molecules into said second gas sample.

8. The device of claim 7 in which said nozzle further comprises:
    input gas orifice means; and
    output gas annulus means surrounding said input orifice means;
    whereby gas through said output annulus means substantially surrounds and confines said first gas sample entering said input orifice means.

9. The device of claim 3 in which said sample chanter is a transparent liquid container, and said detectable content is a liquid.

10. The device of claim 3 in which said sample chamber is a slide stage, and said detectable content is a substance placed upon a slide.

11. The device of claim 3 further comprising:
    an optical throw within said samfple chamber;
    a low f-number optical element producing a first optical throw between said radiant source and said sample chamber; and
    a low f-number optical element producing a second optical throw between said sample chamber and said radiation detection means;
    whereby said first and second throws are each shorter than said optical throw within said sample chamber.

12. The device of claim 3 further comprising:
    timing means to select S amplitude samples at fixed intervals within said difference sequence;
    counting means to digitally index said intervals;
    bipolar amplitude selection means to identify the N largest positive and negative amplitudes within said S samples, where N is an integer less than S;
    polarity sensing means to generate a polarity bit for each of said N amplitudes; and
    combining means to join said polarity bits and their respective interval indices into N digital words;
    whereby said digital words comprise a digital recognition pattern.

* * * * *